United States Patent

[11] 3,580,680

| [72] | Inventor | Walter Leslie Crider<br>Cincinnati, Hamilton, Ohio |
|---|---|---|
| [21] | Appl. No. | 822,191 |
| [22] | Filed | May 6, 1969 |
| [45] | Patented | May 25, 1971 |
| [73] | Assignee | The United States of America as represented by the Secretary of the Department of Health, Education and Welfare |

[54] FLAME EMISSION INSTRUMENT FOR SELECTIVELY MONITORING METAL AEROSOLS
6 Claims, 3 Drawing Figs.

[52] U.S. Cl............................................. 356/87, 250/226, 356/187
[51] Int. Cl............................................. G01j 3/30, G01j 3/48
[50] Field of Search............................... 356/85, 87, 187; 250/226

[56] References Cited
UNITED STATES PATENTS

| 2,730,005 | 1/1956 | Vonnegut | 356/87 |
| 3,075,577 | 1/1963 | Cazalas | 356/87 |
| 3,095,264 | 6/1963 | Rounds et al. | 356/87 |
| 3,381,571 | 5/1968 | Vallee et al. | 356/87 |
| 3,486,827 | 12/1969 | Binek et al. | 356/87 |
| 3,489,498 | 1/1970 | Brody et al. | 356/187 |

*Primary Examiner*—Ronald L. Wibert
*Assistant Examiner*—Vincent P. McGraw
*Attorney*—Browdy and Neimark ABSTRACT: An instrument employing the principle of flame emission spectrophotometry is provided to selectively monitor the mass concentration of $Fe_2O_3$ aerosol in animal exposure chambers. The instrument is calibrated over the range from 0.3 to 1.6 milligrams per cubic meter, and the maximum sensitivity is found to be about 3 micrograms of $Fe_2O_3$ aerosol per cubic meter of air.

INVENTOR
WALTER LESLIE CRIDER

BY Browdy and Neimark
ATTORNEY

Fig. 3.

[Graph: Instrument Response, $10^{-8}$ AMP (y-axis, 0 to 10) vs. $Fe_2O_3$ Aerosol Concentration, mg/M3 (x-axis, 0 to 2.0)]

INVENTOR
WALTER LESLIE CRIDER

FLAME EMISSION INSTRUMENT FOR SELECTIVELY MONITORING METAL AEROSOLS

The present invention relates to an instrument for continuously monitoring the mass concentration of metal-containing aerosols, and, more particularly, to such an instrument employing the principle of flame emission spectrophotometry.

As the problems of air pollution have become increasingly serious, more and more research has been conducted in the field to determine not only how to solve the problems of air pollution, but also as to the possible effects of various pollutants. Instruments are needed in various air pollution studies to determine metal aerosol concentrations in the air, e.g. to continuously monitor air samples, not only in experimental situations where the effects of pollutants are being treated, but also in industrial situations to determine compliance with legal pollution standards, environmental health and efficiency of operation including the evaluation of losses such as in chemical processing industries and the steel industry.

In previous chronic animal exposure studies employing a mixture of $NO_2$ gas and $Fe_2O_3$ aerosol to study the effects of these pollutants on test animals, a reaction between the $NO_2$ gas and some unknown gas evolved by the animals under study resulted in the formation of a second unanticipated aerosol. The nonspecific light-scatter aerosol photometer selected for use during such previous study to monitor and control the $Fe_2O_3$ aerosol concentration accordingly gave a response to this extraneous aerosol that was more than twice the response from the $Fe_2O_3$ aerosol concentration to be used in the study itself. Consequently, such light-scatter photometer was not satisfactory in the desired testing.

It is, accordingly, an object of the present invention to overcome the deficiencies of the prior art, such as indicated above.

It is another object of the present invention to provide a device for continuously monitoring the mass concentration of metal-containing aerosols for use in the field of air pollution, industrial hygiene and chamber studies.

It is another object of the present invention to provide a system for the continuous analysis of $Fe_2O_3$ and air without prior sampling and sample preparation.

It is another object of the present invention to provide a system utilizing certain principles of flame photometry.

It is another object of the present invention to provide for continuous atmospheric sampling, and an internal reference for sensitivity, stability, and good sensitivity and precision for quantitative atmospheric analysis.

In general, an instrument is provided, employing the principle of flame emission spectrophotometry, for continuously monitoring the mass concentration of metal-containing aerosols. When the atmospheric sample is drawn into a flame, metallic particles emit light of a wave length characteristic of the particular metal, and the intensity or brightness of the light emitted is proportional to the mass concentration of the aerosol in the sample atmosphere.

Since the concentration of elemental iron in ambient atmosphere in the United States ranges from 0.1 to about 20 micrograms per cubic meter, depending upon the city and sampling location, instruments in accordance with the invention capable of continuously measuring the metal content of the atmosphere are highly desirable in monitoring such ambient air in air pollution studies, as well as in experimental chamber studies in test animals. The present invention has applicability in these fields as well as in the analysis of other metals in various atmospheres, and also to stack and source sampling where concentrations of metals in effluents are quite large, e.g. the steel industry, the chemical processing industry, etc. where the present invention is useful in evaluating losses, environmental health and efficiency of operation.

The above and other objects and the nature of the instant invention will be more apparent from the following detailed description. Such description of the specific embodiment will so fully reveal the general nature of the invention, that others can, by applying current knowledge, readily modify and/or adapt such illustrative embodiment without departing from the generic concept and, accordingly, such modifications and adaptations are intended to be comprehended within the scope of the invention. The specific embodiment will be more fully understood when taken in conjunction with the accompanying drawings wherein:

FIG. 3 is a graph showing the instrument calibration for an $FE_2O_3$ aerosol.

Figure 1:
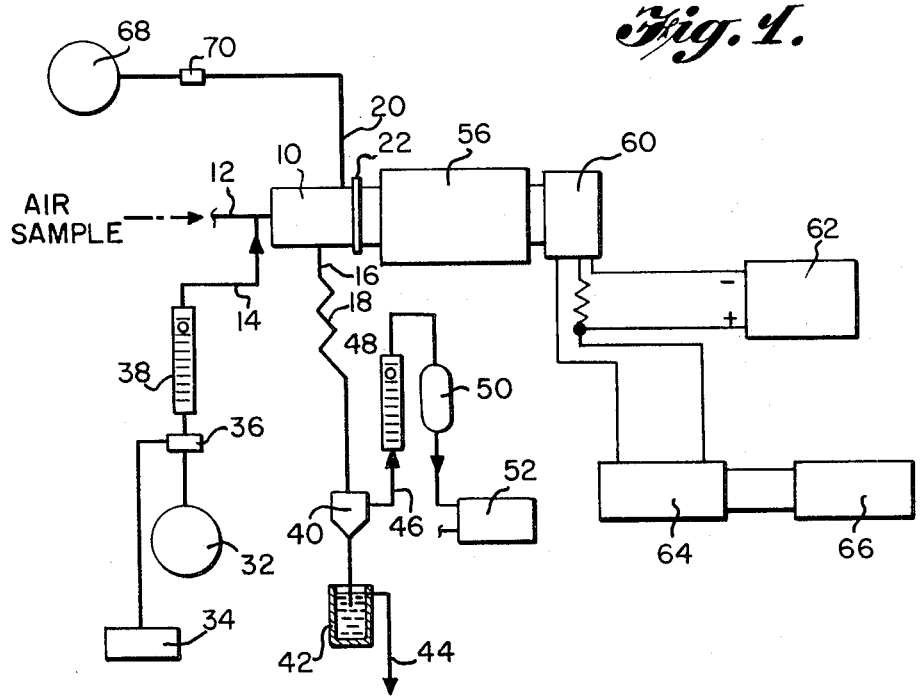
FIG. 1 is a partially diagrammatic flow sheet showing the present invention.

Referring to FIG. 1, there is shown in general a sampling system utilizing the principles of conventional spectrothermal emission instruments, but utilizing the DC electronics of chemiluminescence apparatus. A burner housing 10 is provided in accordance with known practice, but modified as pointed out below. Entering this housing is an air sample inlet tube 12 and a hydrogen fuel inlet pipe 14. If desired, oxygen enrichment (not shown) may be utilized along the length of the air sample inlet 12. Exiting from the burner housing 10 is an exhaust pipe 16 having a condenser 18 along its length. Also provided is a nitrogen inlet pipe 20 feeding to the chamber adjacent a lens holder 22.

Figure 2:
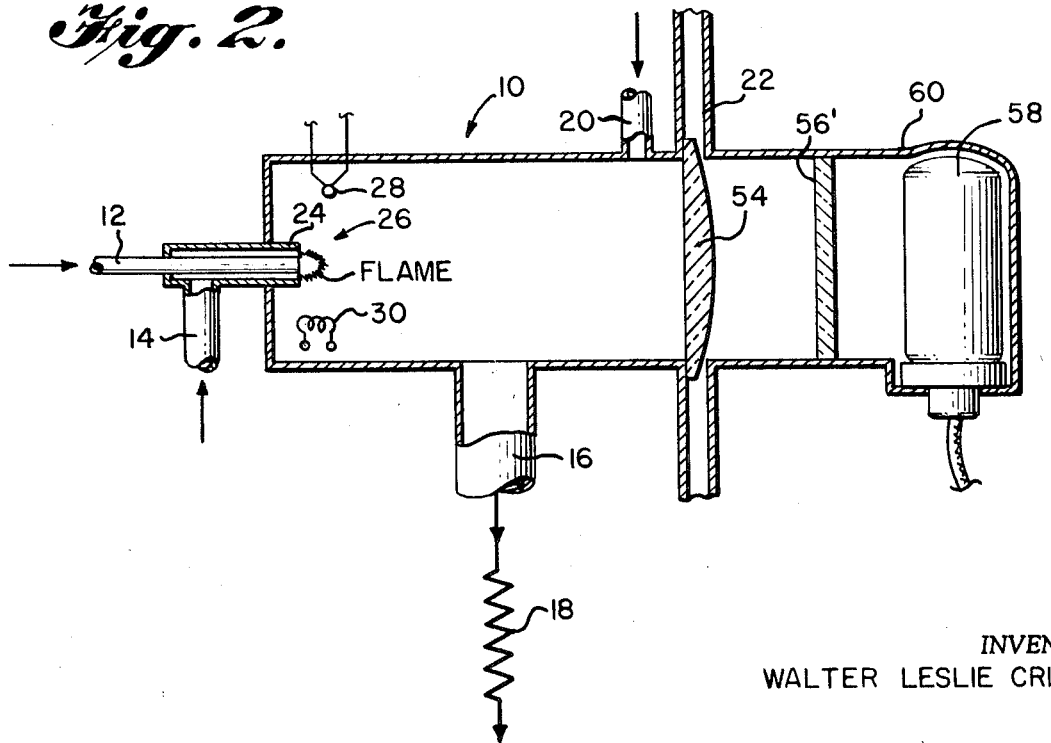
FIG. 2 is a sectional view illustrating the burner housing of the present invention.

The combustion chamber 10 is shown in greater detail in FIG. 2 where it is seen that the terminal portion of the air sample inlet pipe 12 is surrounded by the end 24 of the hydrogen supply pipe 14 to provide a burner tip 26. A thermistor 28 is located adjacent the burner 26 to measure the temperature generated, and an igniter 30 is also provided to initiate burning of the hydrogen.

As can be seen from FIG. 1, the flow of hydrogen from a suitable hydrogen source 32 is controlled by a thermistor controlled circuit 34 in accordance with conventional design which is hooked up with thermistor 28 (not shown) to control a solenoid valve 36. The rate of flow of the hydrogen through the pipe 14 is measured by a suitable flow meter 38.

As will be evident, all solid particles passing in with the air (in an aerosol) through the pipe 12 will be burned at the burner 26 along with the hydrogen passing through the pipe 14. All airborne particles contained in the air sample must pass through the thermalactive combustion zone of the flame and this results in all the particles being exposed to approximately the same exciting energy.

The air sample is pulled into the flame under laminar, nonturbulent flow conditions by a downstream pump (described below) without particle loss which occurs when Venturi or jet lifting devices are employed to bring the air sample to the flame. The use of laminar, nonturbulent flow conditions also negates particle loss which occurs in other burner constructions where the burner tips are composed of multiple openings and where premixing chambers are used. Accordingly, loss of airborne particles due to such devices does not occur in the present burner. In other sample inlet systems, turbulence causes a loss of airborne particles, the loss being higher for larger particles and this results in the sample actually reaching the flame being nonrepresentative of the original atmosphere in either particle size or concentration.

Another advantage in the use of the laminar flow conditions involves the uniformity of the light emitted. Thus, the position of particles in turbulent flames influences the intensity of light emitted whereas a stable flame front, re-resulting from the burner construction shown and laminar flow conditions, provides thermal excitation of all particles to approximately the same state thus reducing the variation in emitted light intensity per particle to the influence of particle size and chemical composition alone.

Referring again to FIG. 1, the excess hydrogen which is not consumed at the burner 26 and the combustion products are passed through the exhaust pipe 16 and through the condenser 16 which may be cooled in any suitable manner (e.g. air or water cooled). The condensable vapors and water drop out of the gas stream and are separated in an air-water separator 40 of known construction. From here, the water flows to a holding tank 42 and is then passed to drain through pipe 44. In the meantime, the remaining combustion gases and unburned hydrogen pass through a pipe 46 containing a flow meter 48 and then through a surgeballast 50 to a discharging air pump 52.

As pointed out above, the air sample is continuously pulled in the thermal emitting zone of the flame, and this is accomplished by the pump 52 which exhausts the noncondensable vapors to the atmosphere thereby providing a slight vacuum in the chamber 10 which in turn gently draws the particle laden air stream through the air sample inlet tube 12 under nonturbulent flow conditions directly to the thermal emitting zone of the flame. The slight negative pressure is maintained continuously constant by utilizing the condenser coil 18 and the air-water separator 40 between the burner housing and the pump 52. These two devices continuously condense water vapor formed by combustion of the hydrogen air flame and remove the liquid water from the flow system. By removing the condensable vapors the flow meter and pump can operate continuously at constant flow.

Referring again to FIGS. 1 and 2 it is seen that the light emitted by the flame at the burner 26 passes through a lens 54 held in the lens holder 22, and this light then passes through a monochromator 56 or other light filter 56' to a photo tube 58 carried in a detector housing 60. The photo tube is powered by a suitable power supply 62 in accordance with known practice, and the effect of the light emitted by the flame at the burner 26 on the photo tube 58 is measured at an electrometer 64 and is recorded on a recorder 66, these instruments being provided in accordance with known designs.

It is an important feature of the present invention to provide for washing of the lens 54; this is accomplished by a flow of inert gas, preferably nitrogen, from a suitable source 68 (such as a tank of compressed nitrogen) through a regulator 70 and through the pipe 20 to the combustion chamber 10 adjacent the lens 54. It has been found that at high aerosol concentrations a loss of instrument sensitivity occurred because of aerosol particle deposition on the lens with a resultant reduction in optical transmission. Provision of the nitrogen gas wash eliminates such a problem. In the preferred embodiment the regulator 70 is merely a porous metal pressure snubber which maintains a constant nitrogen flow at a constant gas pressure.

For a maximum effect, the inert gas flow should be admitted uniformly around the periphery of the lens to offer a physical barrier against the particles in the sample gas. Also, this inert gas should be hot to prevent thermal diffusion of particles which would otherwise occur from the hot combustion gases to the cooler lens surface. Thus, the hot gas maintains the lens at a relatively high temperature.

The optical, spectral filter 56' (or the equivalent monochromator 56) and the photo tube detector 58 and arranged coaxial with the lens 54 and the flame. Thus, the detector 58 views the entire flame of the thermally emitting combustion zone from the external surface of this zone; if desired, the arrangement may be altered to view a selected portion of the flame, as long as the external surface of the flame zone is viewed. By this arrangement the light from all emitting particles passes directly to the detector. This is in contradistinction to conventional sideview flame photometers, wherein light from some emitting particles passes from the far side of the flame through the body of the flame where light absorption occurs; light from only some of the emitting particles thus passes directly to the detector. This light loss in conventional side view, diffuse-flame photometers results in less sensitive instruments than that of the present invention.

The following example, set forth to further describe but not to further limit the invention, shows the use of the instrument to continuously monitor and control the $Fe_2O_3$ aerosol mass concentration in a 3 cubic meter dynamic flow animal exposure chamber. Operating characteristics were determined with the instrument sampling air from the animal exposure chamber. Air flow through the chamber was maintained at about 1.5 cubic meters per minute, the relative humidity at about 40 percent, and the temperature at about 75° F. In addition, the hydrogen flow rate was maintained at 410 ml. per minute and the air flow rate was maintained at 625 ml. per minute. For maximum instrument response to the $Fe_2O_3$ aerosol, the monochrometer was set at 568 m$\mu$, and a bias potential of from 700 to 1,000 volts was used across the photomultiplier tube 58 to give an optimum electronic signal-to-noise ratio.

Before the relationship between instrument response and $Fe_2O_3$ aerosol mass concentration was determined, the instrument sensitivity was checked. The clean-air flame was used as a standard reference light source against which the instrument sensitivity was adjusted to a preselected value. With a shutter in front of the photomultiplier tube 58 closed, the background dark current was canceled with a buck-out circuit. The shutter was then opened and the voltage across the photomultiplier tube adjusted until the instrument responds to the light emitted by the clean-air flame was $8.5 \times 10^9$ amps. The shutter was closed and opened several times with appropriate adjustments made to cancellation current and photomultiplier tube bias voltage until these adjustments were no longer necessary. After this procedure, the instrument sensitivity was standardized against internal reference.

The instrument was calibrated for $Fe_2O_3$ aerosols by comparing instrument response to mass concentrations determined by chemically analyzing samples of measured aerosol volumes collected on glass fiber filters. FIG. 3 illustrates the instrument response as a function of $Fe_2O_3$ aerosol mass concentration. As can be seen from this graph, instrument response is a linear function of concentration up to about 1.0 milligrams per cubic meter. Above this concentration, the increase in response is at a lower rate than the corresponding increase in concentration.

Because the principle by which the present instrument measures $Fe_2O_3$ aerosol mass concentrations is based on measuring the light intensity emitted by particles heated in the combustion zone of an air-hydrogen flame, the response time is primarily controlled by the time constants of the electronic circuits and the time required for the aerosol to pass from the animal exposure chamber to the flame. When $Fe_2O_3$ aerosol having a concentration of 0.5 mg. per cubic meter was sampled from the chamber through a one-quarter inch inner diameter tube of about four feet in length, the instrument indicated 95 percent of the equilibrium response within 15 seconds.

The precision with which $Fe_2O_3$ aerosol concentrations were shown over a 5 day period when the instrument was being continuously used to monitor and control $Fe_2O_3$ aerosol at the 1.0 mg. per cubic meter concentration level. From the scatter of individual measurements as illustrated in FIG. 3, it was determined that the precision with which this instrument can measure $Fe_2O_3$ aerosol mass concentration is always within $\pm 12$ percent over the range of 0.1 to 1.0 mg. per cubic meter and within $\pm 14$ percent over the range of 1.1 to 1.5 mg. per cubic meter. With the instrument sampling clean air, the baseline drift of this instrument was only $\pm 1 \times 10^{110}$ amps per hour, and the total instrument baseline stability was only $\pm 0.05 \times A 10^{110}$ amps.

By expanding the scale of FIG. 3 and extrapolating to a response equivalent to a signal-to-noise ratio of 2, the maximum sensitivity for the present instrument is shown to be only about 3 mg. of $Fe_2O_3$ aerosol per cubic meter of air.

The instrument was also tested with lead oxide aerosols and the instrument showed a sensitivity proportional to the intensity of the emission wave length of the metal being monitored. When the relatively weak 405 m$\mu$ emission line of lead was transmitted through the monochromator 56, about 90 mg. of lead oxide per cubic meter of air was the minimum concentration that would give a signal-to-noise ratio of 2.

The instrument of the present invention provides internal sensitivity standardization, i.e. the sensitivity of the electronic circuitry and photosensitive detectors adjusted to a constant value by taking advantage of the constant light source of the hydrogen-air flame exposed to clean air. This periodic adjustment corrects any change in instrument sensitivity that may be caused by dirty optical elements, deterioration of the photomultiplier tube, sensitivity, or by changes in electronic circuit sensitivity.

From the description above of the specific embodiment, it will be apparent that the present invention includes the following five improvements:

1. Uniform heating of all particles is accomplished so that each airborne particle is subjected to the same temperature as all other particles. Accordingly, all particles having the same size emit the same intensity of light. This is accomplished by the stable flame front through which all particles in the air stream must pass. Other burners employing turbulent flames, premixtures of air and fuel, and flame arrestors have hot and cool spots giving nonuniform spacial temperature distribution. Thus, particles in these other flames may not all be subjected to the same temperatures and, accordingly, the intensity of light emitted by the same size particles may vary according to positions within the flame.

2. Uniform, direct viewing by the sensor of all emitting particles is brought about by the positioning of the photo tube in relation to the flame. Each emitting particle is used directly by the sensor without its light being selectively attenuated by other particles or by combustion gases. This is accomplished by an optical system whose central axis is the same as the central axis of the burner.

3. The laminar feeding of airborne particles into the system by creating a vacuum in the combustion chamber through the pumping of exhaust gases is also significant to obtain nonturbulent flow. Airborne particles are drawn gently through the inlet passages under laminar flow conditions so that particle loss is minimal. All jet-lifting Venturi sample injectors, premixing, and flame arresting screens as used in other burners and which cause loss of airborne particles to the surfaces of these devices are avoided by the sample flow system in the present invention.

4. The lens cleaning inert gas flow prevents the optical lens from becoming dirty, thus maintaining constant high transmission of light through this element for long periods of time, even under high dust concentration usage.

5. The internal sensitivity standardization technique offers the advantage of day to day reproducibility of sensitivity. The technique used in the present invention is simple to use and requires no devices or part external to the instrument itself.

It is to be understood that the invention is not limited to the embodiment disclosed which is illustratively offered and that modifications may be made without departing from the invention.

I claim:

1. A device for measuring mass concentration of metal containing particles in gas comprising:
    a burner housing containing a burner having only a gas sample inlet tube and a concentric fuel supply tube thereabout ending about in a common plane; and a combustion gas outlet tube leading from said housing;
    means provide fuel gas through said fuel supply tube to said burner;
    means to exhaust combustion gases from said housing through said outlet thereby creating a vacuum within said housing to gently draw metal containing particles in a gas sample through said gas sample inlet tube to said burner;
    means to initiate burning of said fuel at said burner;
    and unshielded optical sensing means aligned axially with said burner for determining the metal content of the gas sample by analyzing the flame at said burner using flame emission spectrophotometry.

2. A device in accordance with claim 1 wherein said optical sensing means comprising a lens, mounted opposite said burner and forming one wall of said housing.

3. A device in accordance with claim 2 further comprising means to feed hot inert gas to said housing in the vicinity of said lens to effect washing of said lens.

4. A device in accordance with claim 3 wherein said optical sensing means further comprises an optical filter located optically downstream from said lens, and a photo tube detector located optically downstream from said optical filter.

5. A device in accordance with claim 3 wherein said means to exhaust combustion gases from said housing comprises an exhaust pump located along the length of said gas outlet tube, and further comprising located in series along said gas outlet tube a condenser, a water-gas separator, and a flowmeter.

6. A device in accordance with claim 3 further comprising means to control the rate of fuel gas flow to said burner, said control means including a thermistor located adjacent said burner.